(12) United States Patent
Schlager et al.

(10) Patent No.: US 10,160,865 B2
(45) Date of Patent: Dec. 25, 2018

(54) LOW GLOSS HYBRID POWDER COATING

(71) Applicant: TIGER DRYLAC U.S.A. Inc., St. Charles, IL (US)

(72) Inventors: Gerd Schlager, Wels (AT); Wolfgang Scheinecker, Wels (AT); Konrad Sebastian Binter, Wels (AT)

(73) Assignee: TIGER DRYLAC U.S.A. INC., St. Charles, IL (US)

( * ) Notice: Subject to any disclaimer, the term of this patent is extended or adjusted under 35 U.S.C. 154(b) by 0 days.

(21) Appl. No.: 15/588,259

(22) Filed: May 5, 2017

(65) Prior Publication Data

US 2018/0319995 A1   Nov. 8, 2018

(51) Int. Cl.
| | | |
|---|---|---|
| *C09D 5/03* | (2006.01) | |
| *C09D 157/10* | (2006.01) | |
| *C09D 167/00* | (2006.01) | |
| *C09D 7/61* | (2018.01) | |

(52) U.S. Cl.
CPC ............. *C09D 5/032* (2013.01); *C09D 5/033* (2013.01); *C09D 7/61* (2018.01); *C09D 157/10* (2013.01); *C09D 167/00* (2013.01)

(58) Field of Classification Search
CPC .......... C09D 5/032; C09D 7/61; C09D 5/033; C09D 7/1216; C09D 157/10; C09D 167/00
USPC ......................................................... 524/445
See application file for complete search history.

(56) References Cited

U.S. PATENT DOCUMENTS

| | | | |
|---|---|---|---|
| 6,337,108 B1 | 1/2002 | Yamaguchi et al. | |
| 8,969,577 B2 | 3/2015 | Nesvadba et al. | |
| 9,012,556 B1 | 4/2015 | Mahn | |
| 9,206,320 B1 * | 12/2015 | Daly | C09D 5/032 |
| 2006/0058427 A1 * | 3/2006 | O'Neill | B01F 3/18 |
| | | | 523/319 |
| 2008/0268286 A1 | 10/2008 | Ishihara et al. | |
| 2009/0192247 A1 * | 7/2009 | Daly | C08K 3/22 |
| | | | 524/81 |

FOREIGN PATENT DOCUMENTS

EP        1848782        10/2007

OTHER PUBLICATIONS

International Search Report and Written Opinion Issued in Corresponding PCT Application No. PCT/US2018/031007, dated Aug. 2, 2018.

* cited by examiner

*Primary Examiner* — Hui H Chin
(74) *Attorney, Agent, or Firm* — Norton Rose Fulbright US LLP (57) ABSTRACT

A curable powder coating composition comprising one or more hydroxyl or carboxyl functional polyester(s) (A), one or more hydroxyl or carboxyl functional acrylic resin(s) (B), one or more cross linker(s) (C) able to react with (A) and/or (B).

17 Claims, 5 Drawing Sheets

LOW GLOSS HYBRID POWDER COATING

FIELD OF THE INVENTION

The present invention relates to powder coating formulations, particularly powder coating compositions having improved chemical resistance and matte surfaces.

BACKGROUND

The desire for resilient powder coatings is becoming increasingly popular. Today, there are well known basic powder chemistries that have been utilized over the past several decades that meet standard durability requirements. However, most powder chemistries available in the current industry are not equipped with the appropriate chemical makeup for extreme situations or environments. As this form of ultra-durable powder coating becomes more prevalent, innovations of the chemical makeup of typical powder coating chemistries is in high demand.

Today, there are several well-known chemical makeups known in the industry that are defined as durable powder coatings. Examples of known durable powder chemistries include: polyester, polyester/isocyanate, acrylic and fluoropolymer powder coatings. More than 60 percent of the market utilizes polyester-based coatings, which are equipped to withhold a measureable amount of standard outdoor environments such as corrosion and ultra-violet light exposure. Depending on the specifications these powder coatings are available in a wide gloss range from high-gloss to dull-matte finish. However, when these coatings are exposed to chemical, biological or decontaminating reagents, they are unable to withstand such harsh environments.

U.S. Pat. No. 9,206,320 B1 relates to matte-appearance chemical-agent-resistant powder coating compositions, which comprise a resin component, a polyisocyanate-containing uretdione cross-linking agent, a catalyst, and a flattening agent. The resin component may comprise a hydroxyl-containing resin and a hydroxyl-containing halogenated copolymer resin. Catalyzed cross-linking of the uretdione isocyanate groups and resins of the resin component during curing preferably is disclosed to yield a finished-form film with low levels of gloss and sheen and chemical-agent resistance.

U.S. Pat. No. 9,012,556 B1 describes low reflectance chemical agent resistant coating compositions comprising a first acrylic powder resin having a hydroxyl value of at least about 180, a second acrylic powder resin having a hydroxyl value less than about 45, a crosslinker reactive with the hydroxyl functional acrylic resins and wollastonite.

U.S. Pat. No. 8,969,577 B2 is directed to curable compositions comprising a thermolatent amidine base and an organic material which is polymerizable or crosslinkable with a basic or nucleophilic catalyst. In particular, the document describes curable coating compositions, especially powder coating compositions, and curable adhesive compositions, as well as the use of a thermolatent amidine base as a curing catalyst for thermally induced base-catalyzed polymerization or crosslinking reactions. The polymerizable or crosslinkable organic material may be a two-component system comprising a hydroxyl group-containing polyacrylate and/or polyester and an aliphatic or aromatic polyisocyanate.

SUMMARY OF THE INVENTION

The present invention relates to a curable, dull-matte, powder coating composition, accommodating superior chemical resistance through a unique and innovative complex of hydroxyl-functional polyesters and acrylic-copolymers that are cross-linked through the utilization of isocyanates—preferably blocked isocyanates—and/or other suitable curing agents. It provides a system which shows a high chemical resistance in combination with good mechanical flexibility. Furthermore, in a special and preferred version of the present invention, fluorinated resins or organic compounds are added to the composition. In particular this complex, with the addition of various PFA (perfluoroalkoxy polymers) and/or polytetrafluoroethylene (PTFE) additives, implements optimal durability, survivability and chemical agent resistant absorbance; while maintaining a matte surface. The present invention ultimately yields a cutting edge, hybrid powder coating that enables any coated surface to sustain durability in vast environments and to resist absorption of chemical, biological and decontaminating reagents if and when exposed to. In special and preferred embodiments of the present invention the final powder coating material can even lead to a coated surface with such an improved resistance to chemical, biological and decontaminating reagents, e.g., mustard gas, that the specification MIL-PRF-32348 can be fulfilled.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF THE INVENTION

Slight variations above and below the given ranges can be used to achieve substantially the same results.

With regard to the present invention and especially concerning the accompanying claims, it is understood that any combination of the subject matter of the different claims falls under the idea and the following disclosure of the present invention, although the subclaims are, for formal reasons, been made dependent from the main claim only.

According to the present invention, a highly saturated hydroxyl or carboxyl-functional polyester resin component can serve as the functional binder of the powder coating. The invention is not limited to a special polyester formulation. Typical examples of the acid component include, but are not restricted to terephthalic acid, isophthalic acid, trimellitic acid, adipic acid, polybasic acids and pyromellitic acid, to name a few. Typical examples of the alcohol component include, but are not restricted to: ethylene glycol, 1,4-butanediol, 1,6-hexanediol and neopentyl glycol. The used polyester can be hydroxyl-, carboxyl-functional or a combination thereof in one or more polyesters.

Some typical polyesters and monomers for such polyesters can be found in U.S. Pat. No. 9,206,320 B1 and EP 1 848 782 B1.

Also unsaturated monomers like alcohols and acids can be used for the invention.

A preferred hydroxyl-functional polyester resin has a density of about 1.2 g/cm³, an hydroxyl value of about 10 to 350, preferably between 200 and 250 mg KOH/g and a Tg above 30° C. and is produced by polymerization of at least one acid component and at least one alcohol component.

Suitable monomers of polyesters and/or polyesters are well known in the field and are for example listed in U.S. Pat. No. 9,206,320 B1.

For the present invention, the hydroxyl or carboxyl-functional polyester(s) (A) are then reacted with one or more hydroxyl or carboxyl-acrylic copolymer resin(s), having a Tg above 30° C. Surprisingly it was found that hydroxyl or carboxyl-acrylic (co)polymer (B) based resins can implement high chemical resistance together with a matt appearance when combined with hydroxyl or carboxyl functional polyester-resins to formulate powder coatings, as long as the amount of functional groups in the hydroxyl- or carboxyl-acrylic copolymer and the hydroxyl or carboxyl functional polyester resin differs significantly and furthermore not only a certain low gloss level but also still sufficient mechanical flexibility can be achieved. Furthermore it was surprisingly found that for a matt appearance the combination of acrylic and polyester resin with approximately the same difference in acid or hydroxyl-value give a higher gloss reduction compared to a combination of polyester/polyester or acrylic/acrylic. The difference of functional group value(s) between the hydroxyl or carboxyl-functional polyester and hydroxyl or carboxyl-acrylic copolymer(s) should be greater than or equal to 30.

Suitable monomers of acryl resins and/or acryl resins are well known in the field and are for example listed in U.S. Pat. No. 9,012,556 B1 and or in U.S. Pat. No. 9,206,320 B1. The used acrylic resins can be hydroxyl-, carboxyl-functional or a combination thereof in one or more polyesters. Also the use of epoxy/GMA groups in the acrylic resin is optional.

The powder coating composition according to this invention further comprises one or more crosslinker(s) able to react with the functional groups of the polyester and/or acrylic resins used, such as blocked isocyanates, uretdiones, cyclic-amide and/or multi-acid compounds to name a few. For a better chemical stability blocked isocyanates are preferred compared to blocked uretdiones. Also glycolurile are suitable option in such cases. Such a combination according to the invention taken can produce a chemical resistant powder coating with gloss values≤35 (as can be seen from the following examples like 1, 4, 5, 6 and 9) measured at a 60° angle. Critically defined by the combination of (A) and (B), the invention at hand has the ability to provide a powder coating, that is able to create a dull-matte finish with a gloss value under 10, measured at 60°. With the addition of other raw materials, the measured gloss value may vary accordingly, in either direction. Suitable crosslinkers are well known in the field and are for example listed in U.S. Pat. No. 9,012,556 B1 and in U.S. Pat. No. 9,206,320 B1.

In some embodiments of the present invention, a blocked cycloaliphatic polyisocyanate is used as crosslinker. In one embodiment a ε-caprolactam blocked trimethylolpropane 4,4'-methylene dicyclohexyl diisocyanate (H12MDI) adduct, with a Tg of 55° C., is used to react with another hardener component in conjunction with a hydroxyl or carboxyl-functional polyester resin and a hydroxyl or carboxyl-acrylic-copolymer to form exterior durable polyurethanes. Said raw material exhibits faster reactivity, better hardness and flexibility than conventional isophorone isocyanate adducts. The preferred blocked cycloaliphatic polyisocyanate should have an NCO % of about 14.0, contain a functionality of 2.2, and have a Tg value near or about 60° C.

In another embodiment of the invention ε-caprolactam blocked trimethylolpropane isophorone diisocyanate adduct, which should contain a cyclic amide or caproic acid, having a Tg value of or near 52° C., is used to crosslink hydroxyl functional groups of polyester and acrylic copolymer-based resins. The addition of blocked polyisocyanate adduct polyols has an influence on the mechanical performance of the powder coating, and the blocked polyisocyanate remains stable during processing up to the unblocking temperatures of more than 160° C. The amount of polyisocyanate derivative can vary from 1 to 50 percent by weight of the total powder coating composition.

Principle Isocyanate Reaction with Alcohol to Produce an Urethane

In another preferred embodiment of the present invention, a polymer with a melting area of 50° C. to 200° C., preferably 100 to 150° C. and a viscosity of 10 to 500 Pas, preferably 50 to 250 Pas and most preferably 90 to 150 Pas at 200° C., measured with plate/plate viscometer at a shear rate of 10 rad/s, is added.

GRILTEX ES 502 as copolyester is a suitable compound which modifies the Gardner Impact Efficiency as well as the flexibility in accordance with ASTM D522 (Mandrel Bend Test of Attached Organic Coatings). The Mandrel Bend Test according ASTM D522 (Method B using a ¼ inch mandrel) is an integral part of the MIL-PRF-32348. Alternative impact modifiers are acrylic based modifiers which offers not only the impact modifier function it offers also a multifunctional combination between impact and weather ability.

In yet another embodiment of the present invention, the hardener (C) in the system comprises one or more carboxylic acid(s) and/or salt(s) of carboxylic acid(s) containing hardeners present in a weight-concentration of below or equal to 50%, preferably below or equal to 20% and most preferably below or equal to 15% of (C). Surprisingly it was found that with that adding that kind of material into the hardener system C allows further gloss reductions even at an already low level of gloss.

Especially the combination from dicarboxylic acids such as nonanedioic acid, decanedioic acid, undecanedioic acid preferably dodecanedioic acid with a compound from 1,2, 4,5 benzenetetracarboxylic acid with 2-phenyl-2-imidazoline pyromellitate (1:1) (CAS 54553-90-1) was preferred as this showed an additional gloss reduction even at a gloss level in the range below 3 (measured at 60° angle).

In a special embodiment of the present invention, the combination from dicarboxylic acids such as nonanedioic acid, decanedioic acid, undecanedioic acid preferably dodecanedioic acid with melamine was also surprisingly found to have an addition gloss reduction effect at very low gloss levels in the range below 3 (measured at 60° angle).

Depending on the color and the associated pigment volume concentration, different filler types, for further gloss reduction, can be used which are commonly known in the field of powder coatings. However, coarse barium sulfate and/or preferably kaolinite in combination with rheological modifiers such as derivatives of smectite clay were found to have a very effective gloss reduction effect.

According to the present invention, flow control agents may be added to the formulation in an amount preferably from 0-15 percent by weight of the total powder composition. In one embodiment, a carboxyl functional acrylic polymer product, which has been converted into free-flowing powder by adsorption onto silica-type carrier, provides excellent re-coatability, clarity and appearance.

According to the present invention, also degassing agents may be added to the formulation, if needed or preferred. Suitable agents are for instance benzoin (preferred), and alternative or in combination for example be Powdermate 542 DG from Estron Chemical can be used.

The utilization or non-utilization of pigments, whether organic- or inorganic-based, can be implemented into the present invention, also regarding the requirements of the MIL-PRF-32348 specification. Such suitable/non-suitable pigments include, but are not limited to titanium dioxides, antimony oxides, chromium oxides, zinc oxides, calcium carbonates, fumed silicas and zinc phosphates, to name a few. In addition, different forms of fillers, including, but not limited to, barium sulfates (e.g., barytes) and/or calcium carbonate, can be used as well.

The addition of fluoro containing organic compounds (D), preferably fluoro containing oligomers and/or polymers in a concentration of between 0.5 and 19 weight percent, preferably between 1 and 10 weight percent and most preferably between 1.5 and 3.5 weight percent based on the sum of (A), (B) and (D) lead to a further increase in chemical resistance. Normally a very high chemical resistance can be achieved by a very crosslinked system. However, a very crosslinked system shows a marked lack of mechanical properties. Surprisingly it was found that the addition of a high molecular PTFE (MW>1000000) as a surface modifier increases the performance against chemical attack. PFA (perfluoroalkoxy polymers), which is a copolymer, exhibits also good mechanical properties and permeation resistance. PFA is similar to PTFE but PTFE is not melt-processable and PFA is melt-processable. This facilitates the manufacture. Additionally to this it was found that the micro-structuring effect of that kind of material additionally has a positive effect on the gloss reduction which additionally allows achieving dull-matt coatings. For the later also other suitable compounds like polyethylene and PMMA (polymethylmethacrylate) with a suitable particle size distribution between 5 and 150 μm can be used. Additionally, the scratch resistance was found to be improved and the friction coefficient (COF) reduced by addition of these materials.

It was found that the further addition of PTFE and/or other suitable fluorocarbons like PFA can not only improve matte appearance, increase scratch resistance, improve structuring and be utilized to yield a fine textured product, but also yields powder coating compositions with improved resistance to chemical, biological and decontaminating reagents, e.g. mustard gas, according to MIL-PRF-32348. Considered a fluorocarbon, this fluorcarbons solid has a high molecular weight and mainly consists of carbon and fluorine. It was even found that mustard gas test standards of MIL-PRF-32348 can be fulfilled. Also the addition of fluoro-polymers with functional groups suitable to react with the crosslinkers C or at least one of the crosslinkers in C can be added according to the invention. Such kind of material is for example FEVE which is known under the trade name Lumiflon.

In yet another embodiment of the present invention, the overall gloss was reduced using additives with a composed form of salt cyclic-amide and or multi-acid compound(s) allowing the yield product to maintain high mechanical strength, while having a matte, yet fine appearance. Cyclic-amide and or multi-acid solids used according to the present invention typically have melting point ranges between 190° C. to 240° C. The amount of cyclic-amide and or multi-acid utilized in the invention is about 1 to 20 weight percent of the total formula composition.

Production of the Powder Coating

The powder coatings composition according to the present invention can be produced by standard production procedures well known in the art such as extruding the components of the coating composition, grinding of the cooled extrudate to a suitable particle size and applying the coating powder to suitable substrates. The application can be performed using any method available, e.g. using electrostatic spraying guns, or by using a fluidized bed.

For some embodiments it might be useful to produce two separate powder coatings, one including a hydroxyl or carboxyl-functional polyester resin, crosslinker(s) and fillers and one including a hydroxyl or carboxyl-acrylic copolymer, crosslinker(s) and fillers, and combining the two separately extruded and ground powder coating compositions before applying them to the substrate (known in the art as 2-component powder coating systems). However, based on the experiments with the powder coating composition according to the present invention, low gloss levels up to below 1 can even be achieved via a so called 1 component system.

The substrate to be coated can be provided at ambient or at elevated temperature.

The powder coating composition according to the present invention can, once applied, principally cured at a broad temperature range of about 130° C.-250° C. for 5 to 50 min. However, a preferred curing cycle was 10 min at 200° C. If necessary the substrate can be pretreated by common means known in the art like sand-blasting, conversion coating etc. and/or one or more primer coatings can be applied before the substrate is coated with the inventive coating described herein.

EXAMPLES

The foregoing is illustrative of the present invention and is not to be construed as limiting thereof. Although a few exemplary embodiments of this invention have been described, those who are experienced in the field of interest will readily appreciate that an exceptional amount of modifications is possible in the exemplary embodiments; not straying from the core techniques and advantages of this invention. In addition, the present invention is not limited to all such modifications and embodiments disclosed. The invention is defined by the following claims and with the claimed equivalents included as well.

If not otherwise stated, the powder coatings shown in the examples were produced via the following route.

Production

Blending

Pilot 3 by Thermo Prism

After weighing together the compounds of the formulation it will be blended with 1000 RPM for 1 min.

Extruder

Twin screw Extruder ZSK 18 by Coperion

Temperature Zones: 60, 80, 100, 120, 120 [° C.]

Screw configuration: Standard configuration (see page 6)

Feeder: Torque 30-40% at 600RPM

Figure 1:
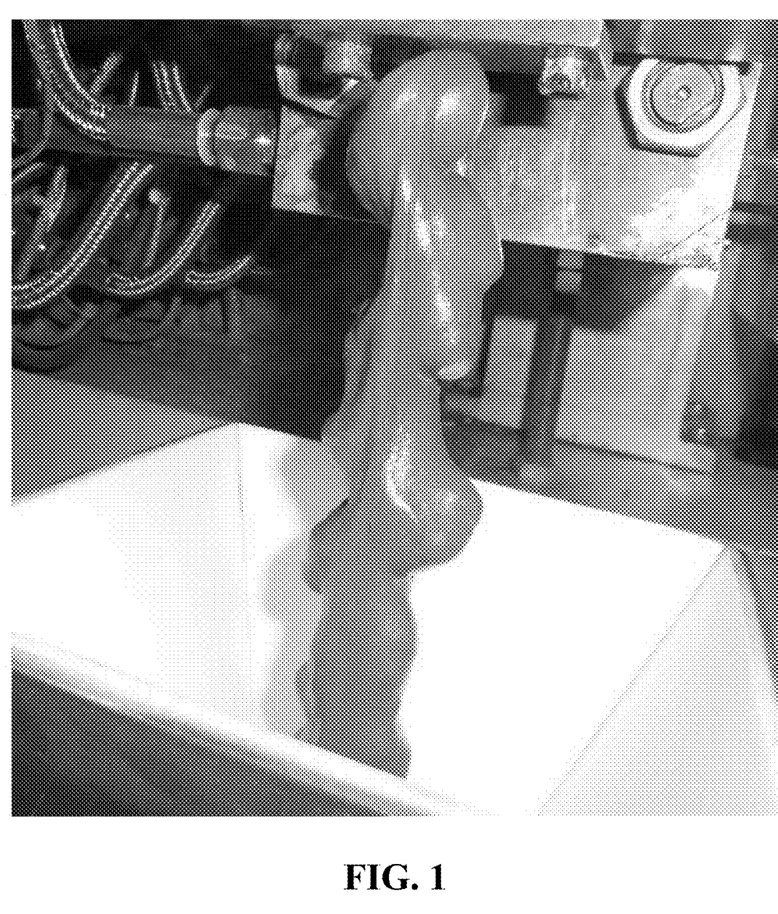
FIG. 1 illustrates extrudate with 3% high molecular PTFE.
Figure 2:
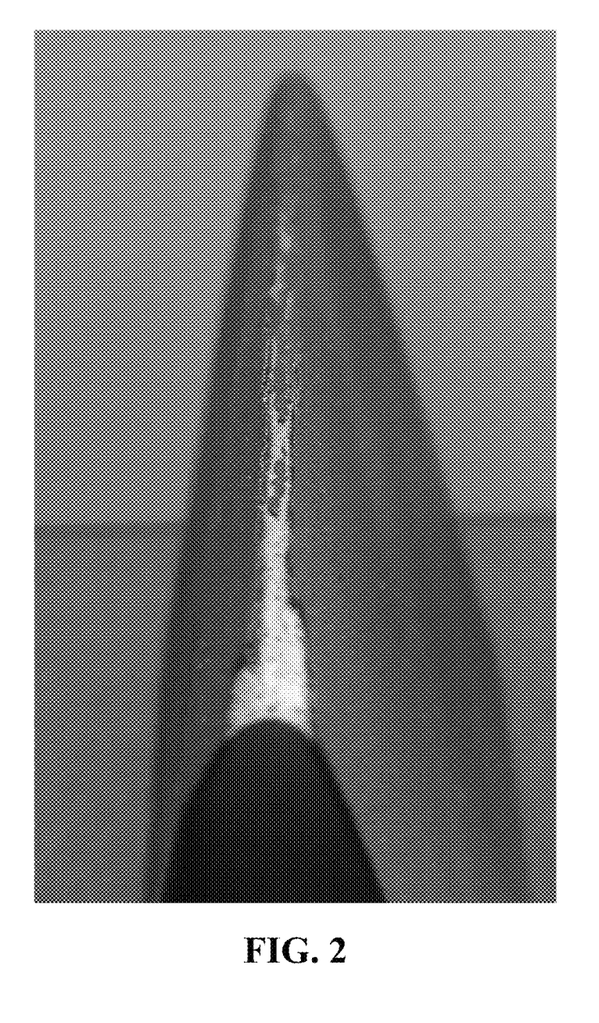
FIG. 2 illustrates a negative result on flexibility test (Example 2).
Figure 3:
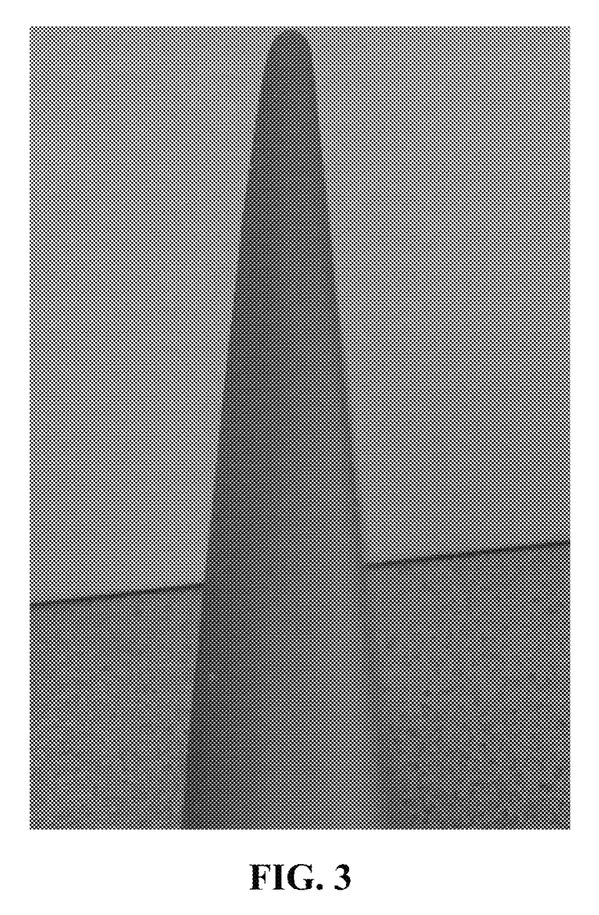
FIG. 3 illustrates a positive result on flexibility test (Example 12).
Figure 4:
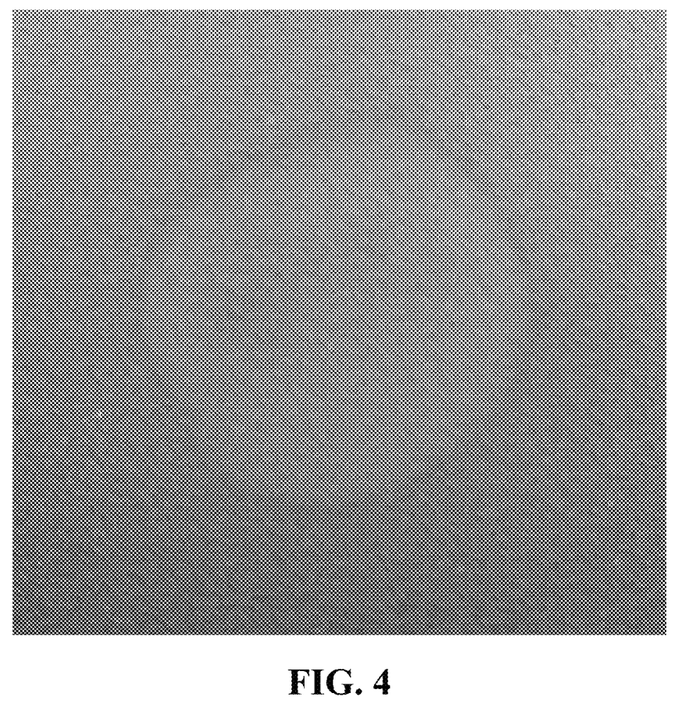
FIG. 4 illustrates a negative result on DS2 Test (Rate 3).
Figure 5:
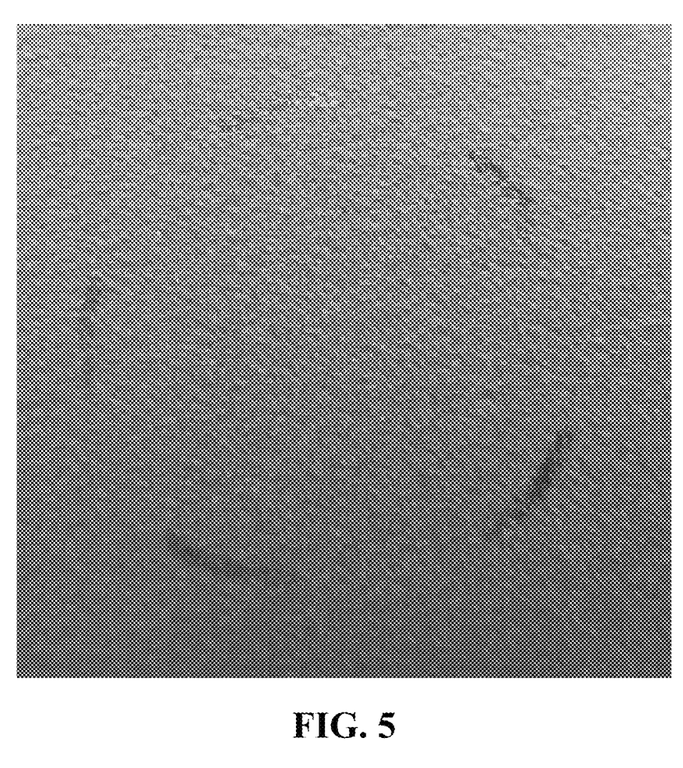
FIG. 5 illustrates a positive result on DS2 test (Rate 1).

As the extrudate leaves the extruder with 120-140° C., the mass has more of a thermoplastic behavior (see picture below) than usual formulations. Especially when high molecular polytetrafluoroethylene (Dyneon TFM 1750 PTFE or Fluo 750FX) or perfluoroalkoxy polymers (Hyflon PFA P7010) where in the formulations. If more than 1% is used then the chips need to be cooled down in a freezer after the production or else they will not break but just be deformed by using a blunt object to break them like usually. In certain formulations it is necessary to reach down to at least 5-10° C. with the cooling drums or else the extrudate will stick to the cooling drums or band.

Milling

ICM 2.4

The chips for the milling should be approximately 1 cm³ or smaller in order to guarantee a good transportation inside the mill. The temperature of the air inside the mill should not exceed 15° C. otherwise the particles will be stuck on the lower half of the cyclone wall. The speed of the mill must be set high enough in particular for the almost thermoplastic chips to break. The particles need to be small enough to produce a closed surface.

Particle Size Distribution

PSD Measuring instrument: Mastersizer 2000

Dry-Dispers unit: Scirocco 2000

After milling, an uppercut at 100 μm should be made to prevent defects on the surface. The PSD was measured with 3.5 bar to rip apart particles that may have built agglomerates.

| | |
|---|---|
| 10 μm | 13-20% |
| 20 μm | 34-42% |
| 32 μm | 50-60% |
| 65 μm | 80-90% |
| 100 μm | 99% |
| d(0.1) | 5-8 μm |
| d(0.5) | 26-32 μm |
| d(0.9) | 54-68 μm |

Spraying Behavior

After sieving the powder, an anticaking agent (aluminumoxid 0.2%) should be mixed into the formulation. The particles will build less agglomerates and a better electrostatic charge could also be observed.

Spraying

Optitronic—Pistol Control Unit by Gema

After a lot of sprayed probes, this is the custom setting that proved to function very good for compositions according to the present invention.

| | | |
|---|---|---|
| High voltage | [kV] | 45 |
| Current | [μA] | 20 |
| Powder output | Nm³/h | 90 |
| Airflow | [Nm³/h] | 2.5 |

Curing Condition

200° C./15 min

Flexibility

Determine flexibility in accordance with ASTM 0522, method B using a 1.4 inch mandrel. Spray the coating, according to manufacturers' recommendations, on a steel panel, tinplated 0.010 inches (0.0254 cm) thick. Examine the coating for cracks over the area of the bend.

Examples

Basic Formulations (Achievable Gloss Grades)

Samples 1-3 Acid Functional Resins

| No. | Constituent/Source | Description | Wt % | 2 (Comparitive Example) Wt % | 3 (Comparitive Example) Wt % |
|---|---|---|---|---|---|
| | Acrylic Resin Joncryl 822 AN BASF | Carboxyl functional acrylic resin with an acid value of 70 mg KOH/g EW 802 g/Eq | | 33.00 | |
| | Acrylic Resin Joncryl 815 AN BASF | Carboxyl functional acrylic resin with an acid value of 40 mg KOH/g EW 1403 g/Eq | 34.00 | 34.00 | |
| | Polyester Resin Crylcoat 2687-2 Allnex Group | Carboxyl functional polyester resin with an acid value of 90 mg KOH/g EW 623 g/Eq | | | 32.00 |
| | Polyester Resin Crylcoat E 37179 Allnex Group | Carboxyl functional polyester resin with an acid value of 70 mg KOH/g EW 802 g/Eq | 33.00 | | 32.00 |

-continued

| No. | Constituent/Source | Description | Wt % | 2 (Comparitive Example) Wt % | 3 (Comparitive Example) Wt % |
|---|---|---|---|---|---|
| | Crosslinking agent Primid XL-552 EMS-Griltech | Hydroxyalkylamide Crosslinker CAS No. [6334-25-4] with an OH value of 660 mg KOH/g EW of 85 g/Eq | 5.50 | 5.50 | 8.0 |
| | Degassing agent Benzoin | Benzoin CAS No. [119-53-9] | 0.70 | 0.70 | 0.70 |
| | Pigment Raven 2000 Black Columbian Chemicals Company, Georgia | Furnace carbon black (C.I. Pigment Black 6) CAS No. [1333-86-4] | 1.00 | 1.00 | 1.00 |
| | Pigment Bayferrox 316 Lanxess Inorganic Pigments, Germany | Iron oxide (C.I. Pigment Black 11) CAS No. [1317-61-9] | 2.37 | 2.37 | 2.37 |
| | Gloss Control agent China Clay Extra ST Kamig AG, Austria | Kaolinite CAS No.[00-1332-58-7] | 23.43 | 23.43 | 23.93 |
| | | total | 100.00 | 100.00 | 100.00 |

Samples 4-9 Hydroxyl Functional Resins

| No. | Constituent/Source | Description | Wt % | Wt % | Wt % | Wt % | Wt % | Wt % |
|---|---|---|---|---|---|---|---|---|
| 1 | Acrylic Resin Joncryl 587 BASF | Hydroxyl functional acrylic resin with an OH value of 92 mg KOH/g EW 610 g/Eq | 26.00 | 26.00 | 26.00 | 27.00 | | |
| 2 | Acrylic Resin AH-800SF Sun Polymers Mooresville, Indiana | Hydroxyl functional acrylic resin with a hydroxyl value of 70 mg KOH/g EW 802 g/Eq | | | | | 27.00 | 27.5 |
| 3 | Polyester Resin Crylcoat 2814-0 Allnex Group | Hydroxyl polyester with a hydroxyl value 295 mg KOH/g EW 190 g/Eq | | | | | | 12.0 |
| 4 | Polyester Resin Crylcoat 2818-0 Allnex Group | Hydroxyl functional polyester resin with an OH value of 100 mg KOH/g EW 561 g/Eq | | | | | 26.00 | |
| 5 | Polyester Resin Crylcoat 2860 Allnex Group | Hydroxyl functional polyester resin with an OH value of 50 mg KOH/g EW 1122 g/Eq | 26.00 | 26.00 | 26.00 | | 26.00 | |
| 6 | Crosslinking agent Crelan NW 5 Covestro AG Leverkusen, Germany | Blocked cycloaliphatic polyisocyanate with a total NCO content of 12.7% EW 333 g/Eq | 20.00 | | | 18.00 | 20.00 | 32.5 |
| 7 | Crosslinking agent Crelan NW 5 +10% (to the stoichiometry) | Blocked cycloaliphatic polyisocyanate with a total NCO content of 12.7% EW 333 g/Eq | | 22.00 | | | | |
| 8 | Crosslinking agent Crelan NW 5 −10% (to the stoichiometry) | Blocked cycloaliphatic polyisocyanate with a total NCO content of 12.7% EW 333 g/Eq | | | 18.00 | | | |
| 9 | Degassing agent Benzoin | Benzoin CAS No. [119-53-9] | 0.7 | 0.7 | 0.7 | 0.7 | 0.7 | 0.7 |

-continued

| No. | Constituent/Source | Description | Wt % | Wt % | Wt % | Wt % | Wt % | Wt % |
|---|---|---|---|---|---|---|---|---|
| 10 | Pigment Raven 2000 Black Columbian Chemicals Company, Georgia | Furnace carbon black (C.I. Pigment Black 6) CAS No. [1333-86-4] | 1.00 | 1.00 | 1.00 | 1.00 | 1.00 | 1.00 |
| 11 | Pigment Bayferrox 316 Lanxess Inorganic Pigments, Germany | Iron oxide (C.I. Pigment Black 11) CAS No. [1317-61-9 | 2.37 | 2.37 | 2.37 | 2.37 | 2.37 | 2.37 |
| 12 | Gloss Control agent China Clay Extra ST Kamig AG, Austria | Kaolinite CAS No.[00-1332-58-7] | 23.93 | 21.93 | 25.93 | 23.93 | 23.93 | 23.93 |
| Total | | | 100.00 | 100.00 | 100.00 | 100.00 | 100.00 | 100.00 |

Gloss Results of Samples 1-8

| Gloss | 1 | 2 | 3 | 4 | 5 | 6 | 7 (comparative example) | 8 (comparative example) | 9 |
|---|---|---|---|---|---|---|---|---|---|
| 20° | 1.3 | 7.0 | 6.0 | 2.0 | 2.0 | 1.7 | 5.0 | 12.0 | 0.8 |
| 60° | 12.6 | 41.0 | 39.0 | 17.0 | 20.0 | 16.0 | 36.0 | 53.0 | 9 |
| 85° | 24.0 | 74.0 | 56.0 | 35.0 | 56.0 | 39.0 | 72.0 | 75.0 | 20 |

DS2 Test Method (Chemical Resistance Test)

If one can see example 1 according to the invention, shows already a gloss level of below 15 at 60°. Surprisingly it was found that the same or nearly the same difference in acid value for acrylic resins (example 2) or polyester resin (example 3) showed much higher gloss values. When hydroxyl functional polyester/polyester combinations where used (like in example 8) even differences of more than 50 in the hydroxyl value led to gloss level above 50. The formulation 7 according to the invention where a difference in the OH-value of 22 lead to a gloss level of 35 at 60° was based on pure acrylic resins, however the flexibility of the coating was poor an early delamination of the coating from the substrate was seen with bending. It was also seen that when formulations according to the invention where used also changes of the stoichiometric content of the hardener led only to a slight change in the gloss (see example 4, 5 and 6). With a preferred difference of functionality according to gloss, mechanics and chemical stability even gloss levels below 10 were possible with hydroxyl functional polyester/acrylic resin(s) combination like shown in example 9. Furthermore it was found that the polyester/polyester combinations showed a much better mechanical performance in respect to flexibility of the coating (like tested with Mandrel bending with ¼ inch according to ASTM 0522 described in more details later on) especially compared to the acrylic/acrylic combinations. However, these polyester/polyester combination (like example 3) generally did not show as high chemical resistance like the acrylic/acrylic combinations. Surprisingly it was found that according to the invention via the combination of acrylic resin(s) and polyester resin(s) with a difference of higher than 30 in the functional groups showed the right balance of mechanical and chemical properties.

In a special embodiment of the invention the powder coatings can even fulfill the requirements of military applications like very low gloss levels, high chemical resistance, mechanical properties and mustard gas test. Further details can on that kind of requirements can be for example found in MIL-PRF-32348. Especially the chemical agent resistance test is of high importance. A suitable method to make a pre-test for that kind of requirement the so called DS2 test.

The chemical resistance test with the DS2 contaminating agent simulates the Army Research Laboratory (ARL) methodology for contamination, against chemical warfare agents (CWA).

DS2 will neutralize all known toxic chemical agents.

The DS2 contamination agent contains 70% diethylenetriamine, 28% ethylene glycol monomethyl ether and 2% sodium hydroxide (3N).

One drop (1 to 2 mL) of the DS2 reagent was added to the surface of the final powder coating, the surface was covered with a watch glass and the DS2 reagent was left to attack the surface for 30 minutes at room temperature. The DS2 reagent was washed off with water. The evaluation criteria for testing results are no brightening and swelling. Numerical valuations ranging from 1 to 3 were assigned. 1 is the best performance and 3 the poorest performance. To get rate 1, no surface changes must be visible, for rate 2 only slight surface changes can be visible such as subtle brightening, for rate 3 strong brightening must occur.

Chemical Resistance Results of Samples 1-9

| 1 | 2 | 3 | 4 | 5 | 6 | 7 | 8 | 9 |
|---|---|---|---|---|---|---|---|---|
| Value 3 | Value 1 | Value 3 | Value 2 | Value 2 | Value 2 | Value 1 | Value 2 | Value 1 |

As can be seen in the example 1 to 9, generally there seems to be the trend that carboxy functional acrylic/polyester combinations according to the invention showed not as good values like the hydroxyl functional ones. Example 2 and 7 (pure acrylic based system) showed good results on the chemical test but was not sufficient in the mechanical flexibility. The best performance was seen in example 9 according to the invention where the chemical stability could be reached together with a sufficient mechanical flexibility.

In particular the formulations 10 to 15 led to very good results according to the requirements for military applications.

Example 10: PFA Black Fed Std. 37030

| No. | Constituent/Source | Description | Wt % |
|---|---|---|---|
| 1 | Acrylic Resin AH-800SF Sun Polymers Mooresville, Indiana | Hydroxyl Acrylic Resin with a hydroxyl value of 70 mg KOH/g EW 802 g/Eq | 27.50 |
| 2 | Polyester Resin Crylcoat 2814-0 Allnex Group | Hydroxyl polyester with a hydroxyl value 295 mg KOH/g EW 190 g/Eq | 12.00 |
| 3 | Crosslinking Agent Crelan NW 5 Covestro AG Leverkusen, Germany | Blocked cycloaliphatic polyisocyanate with a total NCO content of 12.7% EW 333 g/Eq | 32.50 |
| 4 | Flatting Agent Acetomer 68 Aceto Corporation | 2-Phenyl-2-Imidazoline-pyromellitate CAS [54553-90-1] | 2.70 |
| 5 | Flatting Agent DDDA Invista, Germany | Dodecanedioic acid CAS No. [693-23-2] EW of 115 g/Eq | 0.90 |
| 6 | Texturing Agent Lanco 1890 N Lubrizol Ltd, UK | Fluoroethylene based agent CAS No. [9002-84-0] | 2.00 |
| 7 | Flow Control Agent Resiflow P-64F Worlee Chemie Estron Chemicals, Germany | Carboxyl functional acrylic flow control agent | 1.00 |
| 8 | Degassing Agent Benzoin | Benzoin CAS No. [119-53-9] | 0.70 |
| 9 | Surface Modifier Hyflon PFA P7010 Solvay Specialty Polymers, Germany | Semi-Crystalline Perfluorinated resin CAS No. [26655-00-5] | 1.00 |
| 10 | Impact Modifier Griltex ES 502 G EMS-Chemie AG, Suisse | Copolyester | 2.70 |
| 11 | Pigment Raven 2000 Black Columbian Chemicals Company, Georgia | Furnace carbon black (C.I. Pigment Black 6) CAS No. [1333-86-4] | 0.99 |
| 12 | Pigment Bayferrox 316 Lanxess Inorganic Pigments, Germany | Iron oxide (C.I. Pigment Black 11) CAS No. [1317-61-9] | 2.37 |
| 13 | Gloss Control Agent China Clay Extra ST Kamig AG, Austria | Kaolinite CAS No.[00-1332-58-7] | 13.64 |
| | Total | | 100.00 |

Example 11: PFA Green Fed Std. 34094

| No. | Constituent/Source | Description | Wt % |
|---|---|---|---|
| 1 | Acrylic Resin AH-800SF Sun Polymers Mooresville, Indiana | Hydroxyl Acrylic Resin with a hydroxyl value of 70 mg KOH/g EW 802 g/Eq | 27.50 |
| 2 | Polyester Resin Crylcoat 2814-0 Allnex Group | Hydroxyl polyester with a hydroxyl value 295 mg KOH/g EW 190 g/Eq | 12.00 |
| 3 | Crosslinking Agent Crelan NW 5 Covestro AG Leverkusen, Germany | Blocked cycloaliphatic polyisocyanate with a total NCO content of 12.7% EW 333 g/Eq | 32.50 |
| 4 | Flatting Agent Acetomer 68 Aceto Corporation | 2-Phenyl-2-Imidazoline-pyromellitate CAS [54553-90-1] | 2.70 |

| No. | Constituent/Source | Description | Wt % |
|---|---|---|---|
| 5 | Flatting Agent<br>DDDA<br>Invista, Germany | Dodecanedioic acid<br>CAS No. [693-23-2]<br>EW of 115 g/Eq | 0.90 |
| 6 | Texturing Agent<br>Lanco 1890 N<br>Lubrizol Ltd, UK | Fluoroethylene based agent<br>CAS No. [9002-84-0] | 2.00 |
| 7 | Flow Control Agent<br>Resiflow P-64F<br>Worlee Chemie<br>Estron Chemicals, Germany | Carboxyl functional acrylic<br>flow control agent | 1.00 |
| 8 | Degassing Agent<br>Benzoin | Benzoin<br>CAS No. [119-53-9] | 0.70 |
| 9 | Surface Modifier<br>Hyflon PFA P7010<br>Solvay Specialty Polymers, Germany | Semi-Crystalline<br>Perfluorinated resin<br>CAS No. [26655-00-5] | 1.00 |
| 10 | Impact Modifier<br>Griltex ES 502 G<br>EMS-Chemie AG, Suisse | Copolyester | 2.70 |
| 11 | Pigment<br>Duropal Yellow 6218<br>Habich, Austria | Bismuth vanadate<br>(C.I. Pigment Yellow 184)<br>CAS No. [14059-33-7] | 0.65 |
| 12 | Pigment<br>Bayferrox 943<br>Lanxess Inorganic Pigments, Germany | Iron Oxide<br>(C.I. Pigment Yellow 42)<br>CAS No. [20344-49-4] | 2.35 |
| 13 | Pigment<br>Colortherm Green GN<br>Lanxess Inorganic Pigments, Germany | Chromium oxide<br>(C.I. Pigment Green 17)<br>CAS No. [1308-38-9] | 5.95 |
| 14 | Pigment<br>Bayferrox 316<br>Lanxess Inorganic Pigments, Germany | Iron oxide<br>(C.I. Pigment Black 11)<br>CAS No. [1317-61-9] | 3.00 |
| 15 | Pigment<br>Kronos 2310<br>Kronos International Inc. | Rutile Titanium Dioxide<br>(C.I. Pigment White 6)<br>CAS No. [13463-67-7] | 0.22 |
| 16 | Rheological Additive<br>Bentone SD-3<br>Elementis Specialties | Organic derivative of a smectite clay<br>CAS No. [121888-67-3] | 3.00 |
| 17 | Gloss Control Agent<br>China Clay Extra ST<br>Kamig AG, Austria | Kaolinite<br>CAS No.[00-1332-58-7] | 1.83 |
| | Total | | 100.00 |

Example 12: PFA Tan Fed Std. 33446

| No. | Constituent/Source | Description | Wt % |
|---|---|---|---|
| 1 | Acrylic Resin<br>AH-800SF<br>Sun Polymers<br>Mooresville, Indiana | Hydroxyl Acrylic Resin<br>with a hydroxyl value of 70 mg KOH/g<br>EW 802 g/Eq | 26.70 |
| 2 | Polyester Resin<br>Crylcoat 2814-0<br>Allnex Group | Hydroxyl polyester with a hydroxyl value<br>295 mg KOH/g<br>EW 190 g/Eq | 12.00 |
| 3 | Crosslinking Agent<br>Crelan NW 5<br>Covestro AG<br>Leverkusen, Germany | Blocked cycloaliphatic polyisocyanate<br>with a total NCO content of 12.7%<br>EW 333 g/Eq | 31.00 |
| 4 | Flatting Agent<br>Acetomer 68<br>Aceto Corporation | 2-Phenyl-2-Imidazoline-pyromellitate<br>CAS [54553-90-1] | 2.70 |
| 5 | Flatting Agent<br>DDDA<br>Invista, Germany | Dodecanedioic acid<br>CAS No. [693-23-2]<br>EW of 115 g/Eq | 0.90 |
| 6 | Texturing Agent<br>Lanco 1890 N<br>Lubrizol Ltd, UK | Fluoroethylene based agent<br>CAS No. [9002-84-0] | 2.00 |
| 7 | Flow Control Agent<br>Resiflow P-64F<br>Worlee Chemie<br>Estron Chemicals, Germany | Carboxyl functional acrylic<br>flow control agent | 1.00 |
| 8 | Degassing Agent<br>Benzoin | Benzoin<br>CAS No. [119-53-9] | 0.70 |

-continued

| No. | Constituent/Source | Description | Wt % |
|---|---|---|---|
| 9 | Surface Modifier<br>Hyflon PFA P7010<br>Solvay Specialty Polymers, Germany | Semi-Crystalline<br>Perfluorinated resin<br>CAS No. [26655-00-5] | 1.00 |
| 10 | Impact Modifier<br>Griltex ES 502 G<br>EMS-Chemie AG, Suisse | Copolyester | 2.70 |
| 11 | Pigment<br>Colortherm Yellow 10<br>Lanxess | Iron Oxide<br>(C.I. Pigment Yellow 42)<br>CAS No. [51274-00-1] | 0.83 |
| 12 | Pigment<br>Bayferrox 3920<br>Lanxess | Iron Oxide<br>(C.I. Pigment Yellow 42)<br>CAS No. [51274-00-1] | 1.13 |
| 13 | Pigment<br>Bayferrox 130 B<br>Lanxess | Iron Oxide<br>(C.I. Pigment Red 101)<br>CAS No. [1309-37-1] | 0.41 |
| 14 | Pigment<br>Colortherm Green GN<br>Lanxess | Chromium Oxide<br>(C.I. Pigment Green 17)<br>CAS No. [1308-38-9] | 1.00 |
| 15 | Pigment<br>Kronos 2310<br>Kronos International Inc. | Rutile Titanium Dioxide<br>(C.I. Pigment White 6)<br>CAS No. [13463-67-7] | 12.83 |
| 16 | Rheological Additive<br>Bentone SD-3<br>Elementis Specialties | Organic derivative of a smectite clay<br>CAS No. [121888-67-3] | 3.00 |
| 17 | Gloss Control Agent<br>China Clay Extra ST<br>Kamig AG, Austria | Kaolinite<br>CAS No.[00-1332-58-7] | 0.10 |
| | Total | | 100.00 |

Example 13: PTFE Black Fed Std. 37030

| No. | Constituent/Source | Description | Wt % |
|---|---|---|---|
| 1 | Acrylic Resin<br>AH-800SF<br>Sun Polymers<br>Mooresville, Indiana | Hydroxyl Acrylic Resin<br>with a hydroxyl value of 70 mg KOH/g<br>EW 802 g/Eq | 27.50 |
| 2 | Polyester Resin<br>Crylcoat 2814-0<br>Allnex Group | Hydroxyl polyester with a hydroxyl value<br>295 mg KOH/g<br>EW 190 g/Eq | 12.00 |
| 3 | Crosslinking Agent<br>Crelan NW 5<br>Covestro AG<br>Leverkusen, Germany | Blocked cycloaliphatic polyisocyanate<br>with a total NCO content of 12.7%<br>EW 333 g/Eq | 32.50 |
| 4 | Flatting Agent<br>Acetomer 68<br>Aceto Corporation | 2-Phenyl-2-Imidazoline-pyromellitate<br>CAS [54553-90-1] | 2.70 |
| 5 | Flatting Agent<br>DDDA<br>Invista, Germany | Dodecanedioic acid<br>CAS No. [693-23-2]<br>EW of 115 g/Eq | 0.90 |
| 6 | Texturing Agent<br>Lanco 1890 N<br>Lubrizol Ltd, UK | Fluoroethylene based agent<br>CAS No. [9002-84-0] | 2.00 |
| 7 | Flow Control Agent<br>Resiflow P-64F<br>Worlee Chemie<br>Estron Chemicals, Germany | Carboxyl functional acrylic<br>flow control agent | 1.00 |
| 8 | Degassing Agent<br>Benzoin | Benzoin<br>CAS No. [119-53-9] | 0.70 |
| 9 | Surface Modifier<br>Fluoropolymer<br>Dyneon TFM 1750 PTFE, Dyneon | Polytetrafluorethylene<br>CAS No. [9002-84-0] | 1.00 |
| 10 | Impact Modifier<br>Griltex ES 502 G<br>EMS-Chemie AG, Suisse | Copolyester | 2.70 |
| 11 | Pigment<br>Raven 2000 Black<br>Columbian Chemicals Company, Georgia | Furnace carbon black<br>(C.I. Pigment Black 6)<br>CAS No. [1333-86-4] | 0.99 |
| 12 | Pigment<br>Bayferrox 316<br>Lanxess Inorganic Pigments, Germany | Iron oxide<br>(C.I. Pigment Black 11)<br>CAS No. [1317-61-9] | 2.37 |

-continued

| No. | Constituent/Source | Description | Wt % |
|---|---|---|---|
| 13 | Gloss Control Agent<br>China Clay Extra ST<br>Kamig AG, Austria | Kaolinite<br>CAS No.[00-1332-58-7] | 13.64 |
| | | Total | 100.00 |

Example 14: PTFE Green Fed Std. 34094

| No. | Constituent/Source | Description | Wt % |
|---|---|---|---|
| 1 | Acrylic Resin<br>AH-800SF<br>Sun Polymers<br>Mooresville, Indiana | Hydroxyl Acrylic Resin<br>with a hydroxyl value of 70 mg KOH/g<br>EW 802 g/Eq | 27.50 |
| 2 | Polyester Resin<br>Crylcoat 2814-0<br>Allnex Group | Hydroxyl polyester with a hydroxyl value<br>295 mg KOH/g<br>EW 190 g/Eq | 12.00 |
| 3 | Crosslinking Agent<br>Crelan NW 5<br>Covestro AG<br>Leverkusen, Germany | Blocked cycloaliphatic polyisocyanate<br>with a total NCO content of 12.7%<br>EW 333 g/Eq | 32.50 |
| 4 | Flatting Agent<br>Acetomer 68<br>Aceto Corporation | 2-Phenyl-2-Imidazoline-pyromellitate<br>CAS [54553-90-1] | 2.70 |
| 5 | Flatting Agent<br>DDDA<br>Invista, Germany | Dodecanedioic acid<br>CAS No. [693-23-2]<br>EW of 115 g/Eq | 0.90 |
| 6 | Texturing Agent<br>Lanco 1890 N<br>Lubrizol Ltd, UK | Fluoroethylene based agent<br>CAS No. [9002-84-0] | 2.00 |
| 7 | Flow Control Agent<br>Resiflow P-64F<br>Worlee Chemie<br>Estron Chemicals, Germany | Carboxyl functional acrylic<br>flow control agent | 1.00 |
| 8 | Degassing Agent<br>Benzoin | Benzoin<br>CAS No. [119-53-9] | 0.70 |
| 9 | Surface Modifier<br>Fluoropolymer<br>Dyneon TFM 1750 PTFE, Dyneon | Polytetrafluorethylene<br>CAS No. [9002-84-0] | 1.00 |
| 10 | Impact Modifier<br>Griltex ES 502 G<br>EMS-Chemie AG, Suisse | Copolyester | 2.70 |
| 11 | Pigment<br>Duropal Yellow 6218<br>Habich, Austria | Bismuth vanadate<br>(C.I. Pigment Yellow 184)<br>CAS No. [14059-33-7] | 0.65 |
| 12 | Pigment<br>Bayferrox 943<br>Lanxess Inorganic Pigments, Germany | Iron Oxide<br>(C.I. Pigment Yellow 42)<br>CAS No. [20344-49-4] | 2.35 |
| 13 | Pigment<br>Colortherm Green GN<br>Lanxess Inorganic Pigments, Germany | Chromium oxide<br>(C.I. Pigment Green 17)<br>CAS No. [1308-38-9] | 5.95 |
| 14 | Pigment<br>Bayferrox 316<br>Lanxess Inorganic Pigments, Germany | Iron oxide<br>(C.I. Pigment Black 11)<br>CAS No. [1317-61-9] | 3.00 |
| 15 | Pigment<br>Kronos 2310<br>Kronos International Inc. | Rutile Titanium Dioxide<br>(C.I. Pigment White 6)<br>CAS No. [13463-67-7] | 0.22 |
| 16 | Rheological Additive<br>Bentone SD-3<br>Elementis Specialties | Organic derivative of a smectite clay<br>CAS No. [121888-67-3] | 3.00 |
| 17 | Gloss Control Agent<br>China Clay Extra ST<br>Kamig AG, Austria | Kaolinite<br>CAS No.[00-1332-58-7] | 1.83 |
| | | Total | 100.00 |

Example 15: PTFE Tan Fed Std. 33446

| No. | Constituent/Source | Description | Wt % |
|---|---|---|---|
| 1 | Acrylic Resin<br>AH-800SF<br>Sun Polymers<br>Mooresville, Indiana | Hydroxyl Acrylic Resin<br>with a hydroxyl value of 70 mg KOH/g<br>EW 802 g/Eq | 26.70 |
| 2 | Polyester Resin<br>Crylcoat 2814-0<br>Allnex Group | Hydroxyl polyester with a hydroxyl value<br>295 mg KOH/g<br>EW 190 g/Eq | 12.00 |
| 3 | Crosslinking Agent<br>Crelan NW 5<br>Covestro AG<br>Leverkusen, Germany | Blocked cycloaliphatic polyisocyanate<br>with a total NCO content of 12.7%<br>EW 333 g/Eq | 31.00 |
| 4 | Flatting Agent<br>Acetomer 68<br>Aceto Corporation | 2-Phenyl-2-Imidazoline-pyromellitate<br>CAS [54553-90-1] | 2.70 |
| 5 | Flatting Agent<br>DDDA<br>Invista, Germany | Dodecanedioic acid<br>CAS No. [693-23-2]<br>EW of 115 g/Eq | 0.90 |
| 6 | Texturing Agent<br>Lanco 1890 N<br>Lubrizol Ltd, UK | Fluoroethylene based agent<br>CAS No. [9002-84-0] | 2.00 |
| 7 | Flow Control Agent<br>Resiflow P-64F<br>Worlee Chemie<br>Estron Chemicals, Germany | Carboxyl functional acrylic<br>flow control agent | 1.00 |
| 8 | Degassing Agent<br>Benzoin | Benzoin<br>CAS No. [119-53-9] | 0.70 |
| 9 | Surface Modifier<br>Fluoropolymer<br>Dyneon TFM 1750 PTFE, Dyneon | Polytetrafluorethylene<br>CAS No. [9002-84-0] | 1.00 |
| 10 | Impact Modifier<br>Griltex ES 502 G<br>EMS-Chemie AG, Suisse | Copolyester | 2.70 |
| 11 | Pigment<br>Colortherm Yellow 10<br>Lanxess | Iron Oxide<br>(C.I. Pigment Yellow 42)<br>CAS No. [51274-00-1] | 0.83 |
| 12 | Pigment<br>Bayferrox 3920<br>Lanxess | Iron Oxide<br>(C.I. Pigment Yellow 42)<br>CAS No. [51274-00-1] | 1.13 |
| 13 | Pigment<br>Bayferrox 130 B<br>Lanxess | Iron Oxide<br>(C.I. Pigment Red 101)<br>CAS No. [1309-37-1] | 0.41 |
| 14 | Pigment<br>Colortherm Green GN<br>Lanxess | Chromium Oxide<br>(C.I. Pigment Green 17)<br>CAS No. [1308-38-9] | 1.00 |
| 15 | Pigment<br>Kronos 2310<br>Kronos International Inc. | Rutile Titanium Dioxide<br>(C.I. Pigment White 6)<br>CAS No. [13463-67-7] | 12.83 |
| 16 | Rheological Additive<br>Bentone SD-3<br>Elementis Specialties | Organic derivative of a smectite clay<br>CAS No. [121888-67-3] | 3.00 |
| 17 | Gloss Control Agent<br>China Clay Extra ST<br>Kamig AG, Austria | Kaolinite<br>CAS No.[00-1332-58-7] | 0.10 |
|  | Total |  | 100.00 |

Gloss Results of Samples 10-15

| Gloss | 10 | 11 | 12 | 13 | 14 | 15 |
|---|---|---|---|---|---|---|
| 20° | 0.1 | 0.1 | 0.2 | 0.1 | 0.2 | 0.7 |
| 60° | 1.0 | 0.8 | 0.8 | 1.0 | 1.0 | 0.9 |
| 85° | 1.3 | 1.0 | 0.8 | 1.2 | 0.9 | 0.9 |

Chemical Resistance Results of Samples 10-15 According to the DS2 Test.

| 10 | 11 | 12 | 13 | 14 | 15 |
|---|---|---|---|---|---|
| Value 1 | Value 1 | Value 1 | Value 1 | Value 1 | Value 1 |

What is claimed is:
1. A curable powder coating composition comprising:
one or more hydroxyl or carboxyl functional polyester(s) (A) in an amount of 9-90 weight percent based on the overall powder coating composition, the functional polyester(s) (A) being characterized by a Tg of more than 35° C.;
one or more hydroxyl or carboxyl functional acrylic resin(s) (B) in an amount of 9-90 weight percent based on the overall powder coating composition, the hydroxyl or carboxyl functional acrylic resin(s) (B) being characterized by a Tg of more than 35° C.; and
one or more cross linker(s) (C) able to react with (A) and/or (B) in an amount of 1-50 weight percent based on the overall powder coating composition,
wherein the hydroxyl- or acid-value of (A) and (B), or if a mixture of polyesters (A) and/or a mixture of acrylic resins (B) is present, the average hydroxyl- or acid-value of the mixture of the polyesters (A) and/or the mixture of acrylic resins (B), have a difference of higher than or equal to 20, and wherein the weight ratio of (B)/(A) is between 1.0 and 4.5.

2. The powder coating composition according to claim 1, wherein (B) has a hydroxyl value or an average hydroxyl value of more than or equal to 40.

3. The power coating composition according to claim 1, wherein (A) has a hydroxyl value or an average hydroxyl value of more than or equal to 200.

4. The powder coating composition according to claim 1, additionally comprising one or more fluoro containing organic compounds (D).

5. The powder coating composition according to claim 4, wherein the one or more fluoro containing organic compounds (D) are fluoro containing oligomers and/or polymers in a concentration of between 0.5 and 19 weight percent based on the sum of (A), (B), and (D).

6. The powder coating composition according to claim 1, wherein (C) comprises isocyanate based hardeners.

7. The powder coating composition according to claim 6, wherein the isocyanate based hardener is a blocked isocyanate based hardener.

8. The powder coating composition according to claim 7, wherein the blocked isocyanate based hardener is a caprolactam blocked isocyanate based hardener.

9. The powder coating composition according to claim 6, wherein the isocyanate based hardener is present in a weight concentration of more than or equal to 50% of (C).

10. The powder coating composition according to claim 1, wherein (C) comprises one or more carboxylic acid(s) and/or salt(s) of carboxylic acid(s) containing hardeners present in a weight-concentration of below or equal to 50% of (C).

11. The powder coating composition according to claim 7, wherein (C) comprises dodecanedioic acid and/or pyromellitic groups.

12. The powder coating composition according to claim 1, wherein (D) comprises perfluoroalkoxy and/or PTFE compounds.

13. The powder coating composition according to claim 1, additionally comprising a polymer with a melting area of 50° C. to 200° C. and a viscosity of 10 to 500 Pas, measured with plate/plate viscometer at a shear rate of 10 rad/s.

14. The powder coating composition according to claim 4, wherein the one or more fluoro containing organic compounds (D) are fluoro containing oligomers and/or polymers in a concentration of between 1.5 and 3.5 weight percent based on the sum of (A), (B), and (D), and the polymer is a polyester based and/or acrylic based material.

15. The powder coating composition according to claim 1, wherein the powder coating additionally comprises phyllosilicates in a weight-concentration of between 3 and 30 weight percent based on the overall powder coating composition.

16. The powder coating composition according to claim 15, wherein the phyllosilicate is selected from the group comprising china clay, smectite clay, their derivatives or organic derivatives, and mixtures thereof.

17. The powder coating composition according to claim 1, wherein the applied powder coating composition has a gloss level of equal or below 20 measured at 60°.

* * * * *

UNITED STATES PATENT AND TRADEMARK OFFICE
CERTIFICATE OF CORRECTION

PATENT NO. : 10,160,865 B2  
APPLICATION NO. : 15/588259  
DATED : December 25, 2018  
INVENTOR(S) : Gerd Schlager et al.

It is certified that error appears in the above-identified patent and that said Letters Patent is hereby corrected as shown below:

Claim 12, Column 24, Line 7:
Delete "according to claim 1" and replace with -- according to claim 4 --.

Signed and Sealed this
Twenty-sixth Day of March, 2019

Andrei Iancu
*Director of the United States Patent and Trademark Office*